(12) United States Patent
Ghaibeh et al.

(10) Patent No.: US 7,983,192 B2
(45) Date of Patent: Jul. 19, 2011

(54) METHOD, APPARATUS AND SYSTEM FOR A STACKABLE ETHERNET SWITCH

(75) Inventors: Gihad Ghaibeh, Moss Beach, CA (US); Marwan Naboulsi, San Carlos, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 351 days.

(21) Appl. No.: 12/111,176

(22) Filed: Apr. 28, 2008

(65) Prior Publication Data
US 2009/0268748 A1 Oct. 29, 2009

(51) Int. Cl.
*H04L 12/28* (2006.01)
*H04L 12/56* (2006.01)
*H05K 7/10* (2006.01)

(52) U.S. Cl. ............. 370/254; 370/419; 710/2; 710/302
(58) Field of Classification Search .................. None
See application file for complete search history.

(56) References Cited

U.S. PATENT DOCUMENTS

| | | | | |
|---|---|---|---|---|
| 6,793,539 B1 * | 9/2004 | Lee et al. | ...................... | 439/701 |
| 7,184,441 B1 * | 2/2007 | Kadambi et al. | ............. | 370/400 |
| 7,233,601 B1 * | 6/2007 | Poulter et al. | ................. | 370/439 |
| 2003/0169734 A1 * | 9/2003 | Lu et al. | ........................ | 370/386 |
| 2003/0185206 A1 * | 10/2003 | Jayakrishnan | ............... | 370/389 |
| 2003/0193891 A1 * | 10/2003 | Chen et al. | ..................... | 370/217 |
| 2005/0265358 A1 * | 12/2005 | Mishra et al. | ................. | 370/400 |
| 2005/0271044 A1 * | 12/2005 | Hsu et al. | ...................... | 370/360 |
| 2006/0092853 A1 * | 5/2006 | Santoso et al. | ................ | 370/252 |
| 2007/0014234 A1 * | 1/2007 | Santoso et al. | ................ | 370/216 |
| 2007/0053360 A1 * | 3/2007 | Hino et al. | ..................... | 370/392 |
| 2007/0081463 A1 * | 4/2007 | Bohra et al. | .................. | 370/235 |

* cited by examiner

*Primary Examiner* — Chirag G Shah
*Assistant Examiner* — Suk Jin Kang
(74) *Attorney, Agent, or Firm* — Blakely Sokoloff Taylor & Zafman, LLP

(57) ABSTRACT

Implementation of non-blocking switch stacking capability for a switch device using a plug-in stacking module to connect to the switch device. In one embodiment, the plug-in stacking module receives switched data from one switch means of the connected switch device and switches the received switch data to another switch means of the same switch device. In another embodiment, switching configurations are changed so that operation of the switch device in combination with the plug-in stacking module increases a total number of ports for which non-blocking switching is supported.

19 Claims, 9 Drawing Sheets

Plug-in Stacking Module 300

Plug-in Stacking Module 350

METHOD, APPARATUS AND SYSTEM FOR A STACKABLE ETHERNET SWITCH

BACKGROUND OF THE INVENTION

1. Field of the Invention

The present invention generally relates to the field of data switching. In particular, the present invention relates to implementing switch stacking capability for a switch device, and methods for stacking said switch device with one or more other switch devices.

2. Background Art

Currently there exists various switch devices (including certain Ethernet switches) which can interconnect the full input/ouput (I/O) bandwidth of a plurality of front panel ports simultaneously. More particularly, a set of ports of such a switching device can be switchably interconnected such that any data traffic (e.g. data packets) received in one port in the set of ports can be switched to any other port in the set of ports as long as the input bandwidth of the set of ports is not exceeded—i.e. without blocking the switching of any incoming data traffic of the set of ports. This behavior is termed non-blocking switching.

Stacking switches to create a larger aggregate non-blocking switch is currently achieved, for example, by connecting switches with Ethernet cables and dedicating some of the front panel ports solely for the purpose of switch stacking. For example, FIG. 1 illustrates a switch system 100 including a standalone switch device 110 stacked with a standalone switch device 115. Switch device 110 includes a plurality of ports 120a-120h to exchange switched data. Similarly, switch device 115 includes a plurality of ports 125a-125h to exchange switched data. On their own, each of switch devices 110, 115 may support internal non-blocking switching among at least some of their respective sets of ports, e.g. among ports 120a-120h and/or among ports 125a-125h. For example, the respective data switching within switch devices 110, 115 may be via switch chips 130, 135.

According to current practice, standalone switch devices 110, 115 may be stacked, for example, by connecting stacking ports 150a, 150b of switch device 110, respectively, to stacking ports 155a, 155b of switch device 115. Configurable switch components such as switch chips 130, 135 may then be configured—e.g. by switch controllers 140, 145, respectively—to interconnect at least some ports from each of switch devices 110, 115. However, configuration in order to stack switch devices 110, 115 merely redirects switching bandwidth of switch chips 130, 135 from supporting respective front panel ports (e.g. ports 120g, 120h and ports 125g, 125h) to supporting respective stacking ports (e.g. stacking ports 150a, 150b and stacking ports 155a, 155b). The total I/O bandwidth to be directed away from the front ports of stacked switch devices 110, 115 grows with the total number of aggregated ports in stacked switches 110, 115 for which non-blocking switching is to be implemented. This type of stacking is inefficient in that it "burns up" front panel ports in order to support non-blocking switching for fewer remaining front panel ports. This type of stacking both consumes front panel port capacity and uses an excessive number of stacking cables as more stacking connections need to be established to support non-blocking switching for larger aggregations of switch devices at increasingly high bandwidth. The performance and resource costs associated with this type of switch stacking limits the ability to implement non-blocking switching for stacked switches using switches such as switch devices 110, 115.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
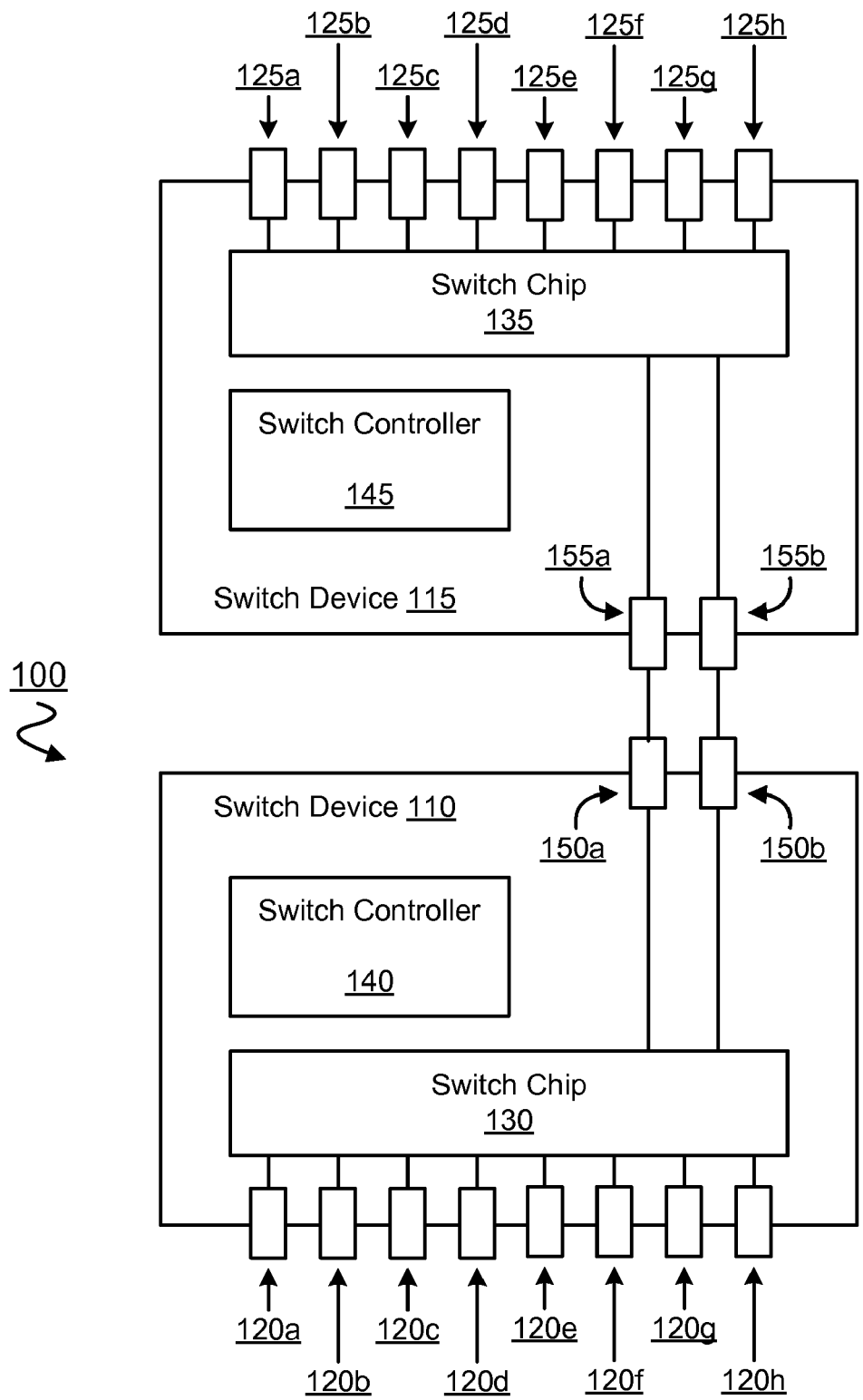
FIG. 1 is a block diagram illustrating a stacked switch configuration according to existing stacked switch systems.

Certain embodiments discussed herein are generally directed to implementing a switch stacking capability for a switch device with a plug-in stacking module ("PISM") for such a switch device. According to various embodiments, such a switch device may be a standalone switch—e.g. a device which can independently provide switching functionality via its own component switch means. Such switching functionality may include Ethernet switching—e.g. switching which is based on or otherwise compatible with the Institute of Electrical and Electronics Engineers (IEEE) 802.3ae standard (adopted June 2002). According to an embodiment, a switch device may independently support non-blocking switching of data among at least some set of ports of said switch device which are switchably interconnected within said switch device. As used herein, "switchably interconnected" is understood to refer to a characteristic of a set of switch ports—including but not limited to switch ports of multiple switch devices—wherein data received at any one port in the set of ports can be switched to any other port in the set of ports.

In an embodiment, a switch device may be coupled to and operate in combination with a PISM to increase a total number of ports in a set of ports for which non-blocking switching is supported ("set of non-blocked ports") by the switch device. For example, the total number of ports may be increased by adding one or more other ports of the same switch device to the set of ports for which non-blocking switching is supported by the switch device. Alternatively or in addition, the total number of ports may be increased by adding one or more ports of another switch device to the set of ports for which non-blocking switching is supported by the first switch device. This other switch device may, for example, be a standalone switch which is stacked with the first switch device, e.g. wherein each of the stacked switch devices operate to contribute to supporting the non-blocking switching of data among the set of ports which spans the two stacked switch devices.

To operate in combination with a PISM as described above, the switch device may, in various embodiments, change a switching configuration of one or more configurable switch components, e.g. to increase a total number of ports in a set of ports for which non-blocking switching is supported. For example, the switch device may include its own internal communications, processing and/or data storage capabilities whereby the switch device changes one or more switching configurations in response to a condition detected by the switch device. As discussed herein, the changing of a switching configuration by the switch device may include changing one or more of (1) a configuration of the switch device itself, and (2) a configuration of the PISM connected to the switch device. According to various embodiments, the switch device may change a switching configuration so that data to be switched from one port of the switch device to another port of the same switch device is switched via the PISM—e.g. in lieu of said switching taking place within the switch device itself. Alternatively or in addition, a switching configuration may be changed to facilitate a combined operation of the switch device and the PISM in a non-stacking configuration—i.e. wherein the switch device is switching data to itself via the PISM even though the switch device is not availing of a capability of the PISM to support stacking of the switch device with any other switch device.

Figure 2:
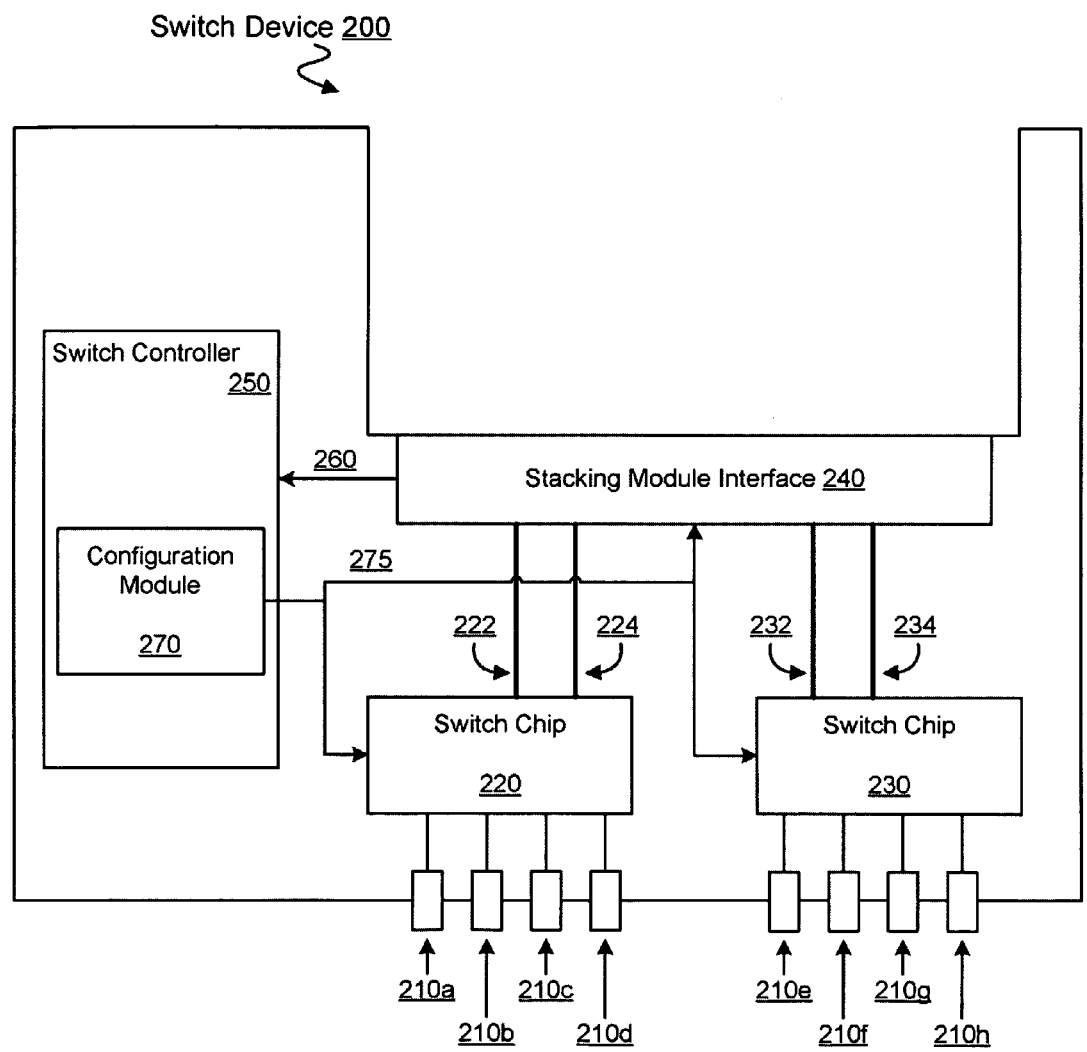
FIG. 2 is a block diagram illustrating select elements of a switch device according to an embodiment.

FIG. 2 illustrates some elements of a switch device 200 to implement non-blocking switch stacking capability according to various embodiments. Switch device 200 may include additional elements which are not shown in order to avoid obscuring certain features of various embodiments. Switch device 200 may include a plurality of ports 210a-210h to exchange switched data. The plurality of ports 210a-210h may include, for example, RJ45 connectors to provide connections for 10 Gigabits per second (Gb/s) Attachment Unit Interface (XAUI) inputs. Although eight ports 210a-210h are shown for illustrative purposes, features discussed herein may be extended to apply either to greater or fewer ports in a plurality of ports of a switch device.

The plurality of ports 210a-210h may provide data traffic (e.g. Ethernet data packets) to component switch means within switch device 200. By way of illustration and not limitation, the component switch means of switch device 200 is illustrated at least in part by switch chip 220 and switch chip 230. More particularly, ports 210a-210d may be switchably interconnected by switch chip 220, and ports 210e-210h may be switchably interconnected by switch chip 230. However, additional and/or alternative switching means may be implemented in various embodiments. In an embodiment, the switch means of switch device 200 may further support non-blocking switching of data among a set of ports. For example, one or more of switch chips 220, 230 may support non-blocking switching for their respective set of ports 210a-210d and 210e-210h.

Certain embodiments of the invention provide one or more channels for exchanging data from the switch means of switch device 200 to a stacking module interface 240, whereby a PISM (not shown) may be coupled to the switch device 200 to provide switch stacking capability to switch device 200. By way of illustration and not limitation, the channels provided from the switching means of switch device 200 to stacking module interface 240 are illustrated as data channels 222, 224, 232 and 234. More particularly, data channels 222, 224 may connect switch device 220 to stacking module interface 240, while data channels 232, 234 may connect switch device 230 to stacking module interface 240. Various embodiments may provide additional or alternative data connections from switching means of a switch device to a stacking module interface. Additionally, switch device 200 may include a power connection to stacking module interface 240 (not shown) whereby switch device 200 provides power required for operation of a PISM.

In order to illustrate how switch device 200 may independently provide non-blocking switching of data among at least some of ports 210a-210h, certain aspects of various embodiments are now discussed with respect to switch chip 220. The example of non-blocking switching by switch chip 220 may be extended to pertain to other additional or alternative switch means of a switch device such as switch chip 230, for example. To provide non-blocking switching for ports 210a-210d, switch chip 220 may have a switching bandwidth which at least equals the total I/O bandwidth of all ports 210a-210d. By way of illustration and not limitation, if each of ports 210a-210d supports a 10 Gb/s XAUI connection to switch chip 220, switch ship 220 may support non-blocking switching of data among the set of ports 210a-210d if a switching bandwidth of switch ship 220 is not less than 4×10 Gb/s=40 Gb/s. Similarly, if in addition to ports 210a-210d, other ports are added to the set of ports for which switch chip 220 supports non-blocking switching, such non-blocking switching may be supported if the other added ports are connected to switch chip 220 via one or more data channels whose total bandwidth is not less than the total I/O bandwidth of ports 210a-210d. By way of illustration and not limitation, if additional ports are to be switchably interconnected with ports 210a-210d via stacking module interface 240, non-blocking switching among all of the ports in question may be accommodated if data channels 222, 224 have a total channel bandwidth not less than the total bandwidth of ports 210a-210d.

The increasing of a total number of switchably interconnected ports for which non-blocking switching is supported may be implemented, for example, by switch device 200 changing a switch configuration of one or more configurable switch components—e.g. via a switch controller 250. Switch controller 250 may include any of a variety of processing, data storage, communication and control mechanisms (not all shown) whereby one or more switch configurations may be detected, analyzed and/or changed. For example, switch controller 250 may receive an indication, e.g. signal 260 via stacking module 240, that additional ports may be added to the set of ports for which non-blocking switching is supported by switch chip 220. Besides signal 260, other additional or alternative signals may be provided to switch controller 250, for example, a signal generated from within switch device 200 or an explicit input provided by an operator configuring switch device 200. In an embodiment, such a received indication may indicate that previously unavailable switching mechanisms have been coupled to switch device 200—such as switching mechanisms of a recently connected PISM (not shown). Alternatively or in addition, such a received indication may indicate that a switching condition necessitates a changed configuration to avail of already-available switching mechanisms—e.g. switching mechanisms within switch device 200 and/or switching mechanisms of a previously detected PISM. Based on the one or more received indications, switch controller 250 may implement a change in a switching configuration—e.g. via a configuration module 270. Depending on the particular change in switch configuration which is to be implemented, control module 270 may variously provide one or more configuration messages 275 to one or more of switch chip 220, switch chip 230, stacking module interface 240 or various other switch components of switch device 200 not shown.

The particular mechanisms and protocols whereby switch controller 250 may variously receive switching configuration information and/or send switching configuration instructions are not described in detail herein so as to avoid obscuring features of certain embodiments. It is appreciated that commonly used switch communication and control methods and mechanisms may be adapted to the various embodiments discussed herein. For example, in order for data traffic to be forwarded automatically to the correct switch device, various component switching hardware such as switch chips 220, 230 may need to recognize, and/or make themselves recognizable to, various switching means such as those of a PISM—e.g. based on assigned IDs of the various chips. In an embodiment, a crossbar switch chip of a PISM (not shown) may need to be initialized and configured when connected to switch device 200 so that the crossbar switch chip "knows" which of switch chips 220, 230 is connected to a particular port of the crossbar switch chip. The particular means by which crossbar switches may be configured to learn switch chip ID information of switch device 200 is widely varying—e.g. based on chip set manufacturer specification.

According to an embodiment of the invention, a switch device having a configuration otherwise similar to that of switch device 200 may include a total of 24 ports that provide a set of 12 10 Gb/s XAUI channels to each of two switch chips. Each of the two switch chips, which may correspond functionally to switch chips 220, 230, may include a 128 Gb/s switching capacity to accommodate full non-blocking switching for the 120 Gs/s I/O bandwidth of their respective 12 10 Gb/s XAUI channels. Furthermore, each of the two switch chips may be connected to a stacking module interface via respective pairs of 64 Gb/s capacity channels functionally corresponding to either pair of channels 222, 224 or 232, 234. In one embodiment, each of the these 64 Gb/s capacity channels may include 4 lanes of 16 Gb/s channels.

Figure 3A:
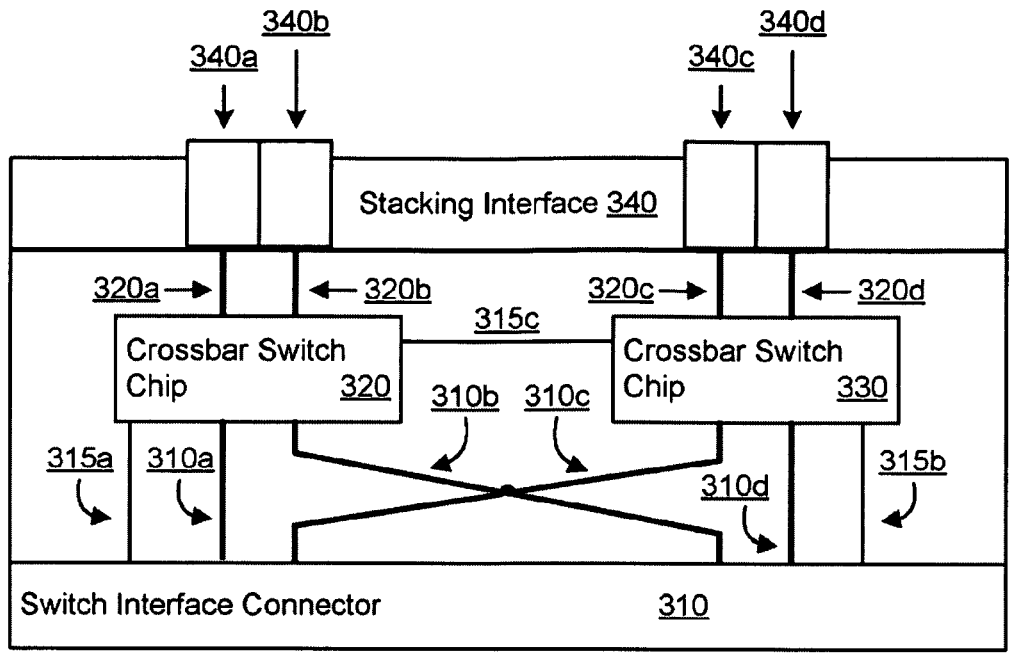
FIG. 3A is a block diagram illustrating select elements of a plug-in stacking module according to an embodiment.

FIG. 3A illustrates select features of a PISM 300 for implementing switch stacking capability according to various embodiments. PISM 300 may include switching means (e.g. crossbar switch means) to provide a switch stacking capability—for example, when connected to a switch device (not shown) such as switch device 200. In an embodiment, the switching means of PISM 300 may all be integrated on a single circuit board, for example. Alternatively or in addition, the PISM 300 may include switching means to provide switching functionality conforming to an Ethernet protocol such as IEEE 802.3ae. By way of illustration and not limitation, switching means of PISM 300 are illustrated at least in part by crossbar switch chip 320 and crossbar switch chip 330. However, features of certain embodiments may be extended to apply to additional or alternative switching means of a PISM such as PISM 300.

PISM 300 may include a switch interface connector 310, for example, to connect PISM 300 to a switch device interface (not shown) such as stacking module interface 240. PISM 300 may also include channels such as data channels 310a-310d to connect switch interface connector 310 to the crossbar switch means of PISM 300. In an embodiment, 310a and 310d may connect, respectively, to crossbar switch chip 320 and crossbar switch chip 330, and channels 310b and 310c may connect, respectively, to crossbar switch chip 320 and crossbar switch chip 330. Crossbar switch chip 320 may switchably interconnect channels 310a, 310b, 320a and 320b, while crossbar switch chip 330 may switchably interconnect channels 310c, 130d, 320c and 320d. Channels 320a, 320b may connect crossbar switch chip 320, respectively, to stacking ports 340a, 340b of stacking interface 340, while channels 320c, 320d may connect crossbar switch chip 330, respectively, to stacking ports 340c, 340d of stacking interface 340.

In an embodiment, PISM 300 may be coupled to, and operate in combination with, a switch device (not shown) to enable such a switch device to increase a total number of ports in a set of ports for which the switch device supports non-blocking switching. For example, based on the particular configuration of a stacked switching system in which PISM 300 is employed, PISM 300 may provide said switch device with a capability to be stacked with one or more other switch devices as an aggregate non-blocking switch device—e.g. using one or more of stacking ports 340a-340d. The total number of non-blocked ports may be increased by extending the support for non-blocking switching to include at least one of (1) one or more additional ports on the same switch device, and (2) one or more ports on one or more other switch devices with which the switch device is to be stacked via PISM 300. In an embodiment, PISM 300 may support such non-blocking switching by providing sufficient I/O bandwidth throughout crossbar switch chips 320, 330, channels 310a-310d and channels 320a-320d. As indicated above with reference to switch device 200, the sufficiency of I/O bandwidth across switch interface connector 310 may be determined by the total I/O bandwidth of the ports for which non-blocking switching is supported. Similarly, this total I/O bandwidth may have to be supported in various embodiments by sufficient bandwidth in crossbar switch chips 320, 330, in channels 310a-310d and in channels 320a-320d.

In addition, the operation of PISM 300 may include one or more of control signals 315a-315c to exchange switching configuration information—e.g. between component switch elements of PISM 300 and/or via switch interface connector 310. Such switching configuration information may include, for example, a configuration command provided from a switch controller such as switch controller 250 and/or from an explicit configuration instruction of a user/administrator. Alternatively or in addition, such switching configuration information may include configuration information generated within PISM 300 itself. In various embodiments, PISM 300 may include various mechanisms whereby PISM 300 directly controls certain aspects of its own configuration and operation. PISM 300 may be able to provide an indication of a switching capability such as a switch stacking capability which may be provided to a switch device (not shown) via switch interface connector 310. For example, PISM 300 may include data storage such as an electrically erasable programmable read-only memory or EEPROM (not shown) to store data identifying PISM 300 or otherwise indicating such switching capability. Additionally or alternatively, PISM 300 may include processing, data storage, communications and/or control mechanisms (not shown) variously capable of determining, storing, updating and/or providing data indicating a current configuration of PISM 300. Additionally or alternatively, similar mechanisms of a switch controller 250 may generate switch configuration signals to directly configure switch means of PISM 300 such as one or more of crossbar switch chips 320, 330.

In an embodiment of the invention, a PISM of configuration otherwise similar to that of PISM 300 may include two pairs of 64 Gb/s capacity channels functionally corresponding to respective pair of channels 310a, 310b of 310c, 310d. Such 64 Gb/s capacity channels may partially cross connect a switch interface connector to two crossbar switch chips of the PISM, as in the configuration shown with respect to crossbar switch chips 320, 330. Each of the switch chips may include a 128 Gb/s switching bandwidth in order to support non-blocking switching for the full bandwidth of the pairs of channels to which the switch chips are connected. Furthermore the two 128 Gb/s may be connected to respective pairs of stacking port corresponding functionally to pairs of stacking ports 340a, 340b and 340c, 340d.

Figure 3B:
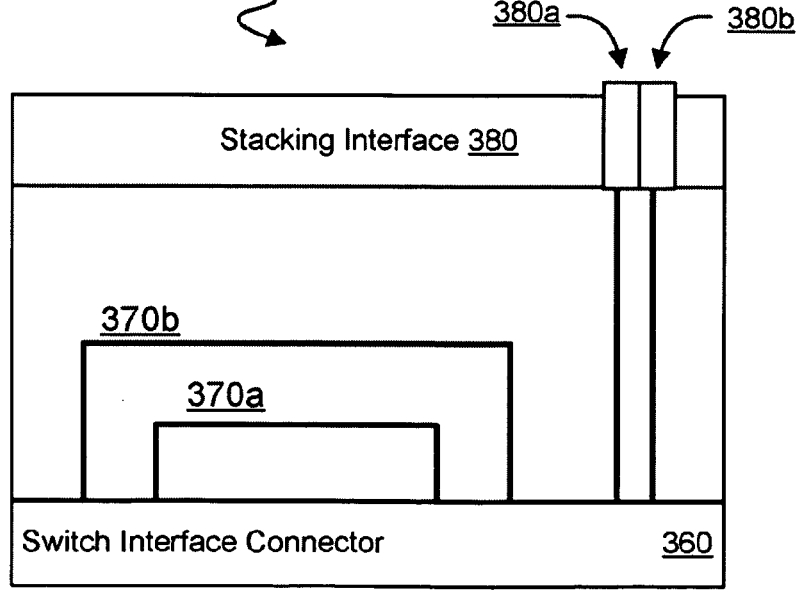
FIG. 3B is a block diagram illustrating select elements of a plug-in stacking module according to an embodiment.

FIG. 3B illustrates select features of a PISM 350 according to various embodiments. PISM 350 is an example of a stacking module which may be connected to and operate in combination with a switch device for which only limited, if any, non-blocking switching is intended. Accordingly, PISM 350 may be considered a limited stacking module in comparison to PISM 300, for example, insofar as PISM 350 may provide less switching capacity than that of crossbar switch chips 320, 330.

In an embodiment, PISM 350 may include a switch interface connector 360, for example, to connect to an interface such as stacking module interface 240. In one embodiment, PISM 350 includes channels such as data channels 370a, 370b, where switch interface connector 360 is simply connected to terminal points of data channels 370a, 370b. In such an embodiment, PISM 350 may be is connected to a switch device (not shown) such as switch device 240, whereby data channels 370a, 370b may provide a new path for one switch means of said switch device to exchange switched data with another switch means of the same switch device. This new path may provide a capacity to interconnect switch means of a switch device which are otherwise not independently available within said switch device. Accordingly, data channels 370a, 370b may operate in a larger switching system to support an increase in a total number of ports in a set of ports of a single switch device for which said switch device supports non-blocking switching—e.g. by interconnecting the set of ports of the single switch device to still other ports of the same switch device.

Alternatively or in addition, PISM 350 may include data channels to exchange switched data between switch interface connector 360 and a stacking interface 380 of PISM 350. More particularly, stacking module 380 may include one or more stacking ports such as ports 380a, 380b to allow for limited switch stacking according to the prior art methods discussed with reference to FIG. 1. Despite the resource cost and inefficiencies of this type of switch stacking, PISM 350 may provide switch devices with backward compatibility for switch stacking with older switch device types.

Figure 4:
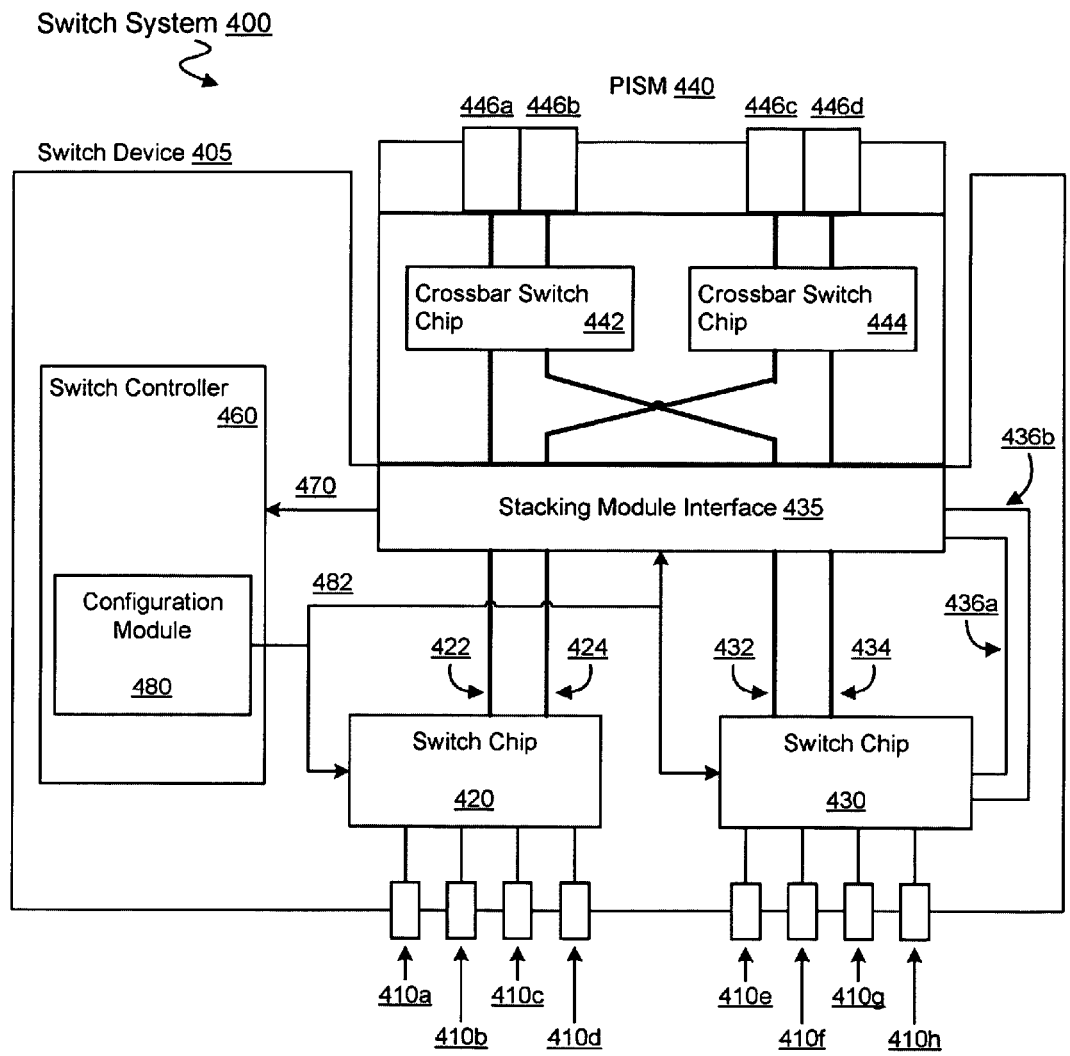
FIG. 4 is a block diagram illustrating select elements of a switch system according to an embodiment.

FIG. 4 illustrates select features of a switch system 400 according to various embodiments. Switch system 400 may include a switch device 405 and a PISM 440. In an embodiment, switch device 405 may include any of a variety of features discussed herein with reference to switch device 200. Alternatively or in addition, PISM 440 may include any of a variety of features discussed herein with reference to PISM 300. As shown in FIG. 4, the front panel of switch device 405 may incorporate four ports 410a-410d switchably interconnected by a switch chip 420, and four ports 410e-410h switchably interconnected by a switch chip 430. It is understood that the particular number and/or arrangement of ports 410a-410h and switch chips 420, 430 are not limiting on aspects of the invention, which may be extended to apply to fewer or greater pluralities of front panel ports configured with any of a variety of additional or alternative switch means in switch device 405. Switch device 405 demonstrates an additional feature according to certain embodiments wherein one or more front panel ports (e.g. ports 410g, 410h) may optionally be switched back to stacking module interface 435—e.g. via channels 436a, 436b. The switching of front panel ports to stacking module interface 435 enables switch device 405 to be configured for backward compatible switch stacking, as is shown herein in the discussion of FIG. 5.

In an illustrative embodiment, ports 410a-410h may include Ethernet ports each with a bandwidth of 10 Gb/s. Each of switch chips 420 and 430 connects to and switchably interconnects, respectively, ports 410a-410d and ports 410e-410h. In order to support full non-blocking switching among their respective sets of front panel ports, each of switch chips 420, 430 may have an internal switching bandwidth no less than the total I/O bandwidth of their respective sets of ports—e.g. 4×10 Gb/s=40 Gb/s. Therefore, switch chip 420 may have a switching bandwidth of 40 Gb/s of Ethernet packet traffic and will route any Ethernet Layer 3 or Layer 2 packet from any port on switch chip 420 to any other port on switch chip 420—e.g. based on standard Ethernet routing rules (e.g. MAC address or IP address based).

Data channels 422, 424 may connect switch chip 420 to stacking module interface 435, and data channels 432, 434 may connect switch chip 430 to stacking module interface 435. PISM 440 is connected to stacking module interface 435 to provide a stacking capability to switch device 400. In an embodiment, switch device 405 may avail of switch stacking via one or more of crossbar switch chips 442, 444 of PISM 440 and their respective stacking ports 446a, 446b and stacking ports 446c, 446d. In order to avail of the switch stacking capacity of PISM 440, switch device 405 may change switching configurations—e.g. via switch controller 460. Switch controller 460 may receive an indication 470 of a switch capability of PISM 440 such as a switch stacking capability. Based on the particular switching configurations to be changed on either or both of switch device 405 and PISM 440, a configuration module 480 of switch controller 460 may selectively transmit configuration messages to switch components of switch system 400.

Switch system 400 may be configured so that PISM 440 only switches for switch device 405. More particularly, crossbar switch chips 442 and 444 may only return to switch device 405 data received at PISM 440 from switch device 405. In such a configuration, the switch device is merely capable of being stacked, and is not actually stacked, with another switch device. Alternatively or in addition, switch system 400 may be connected to one or more other switch devices (not shown) via stacking ports 446a-446d. Stacking ports 446a-446d may provide for switch stacking using fewer, high capacity stacking connectors than those used for previous stack switching methods.

Figure 5:
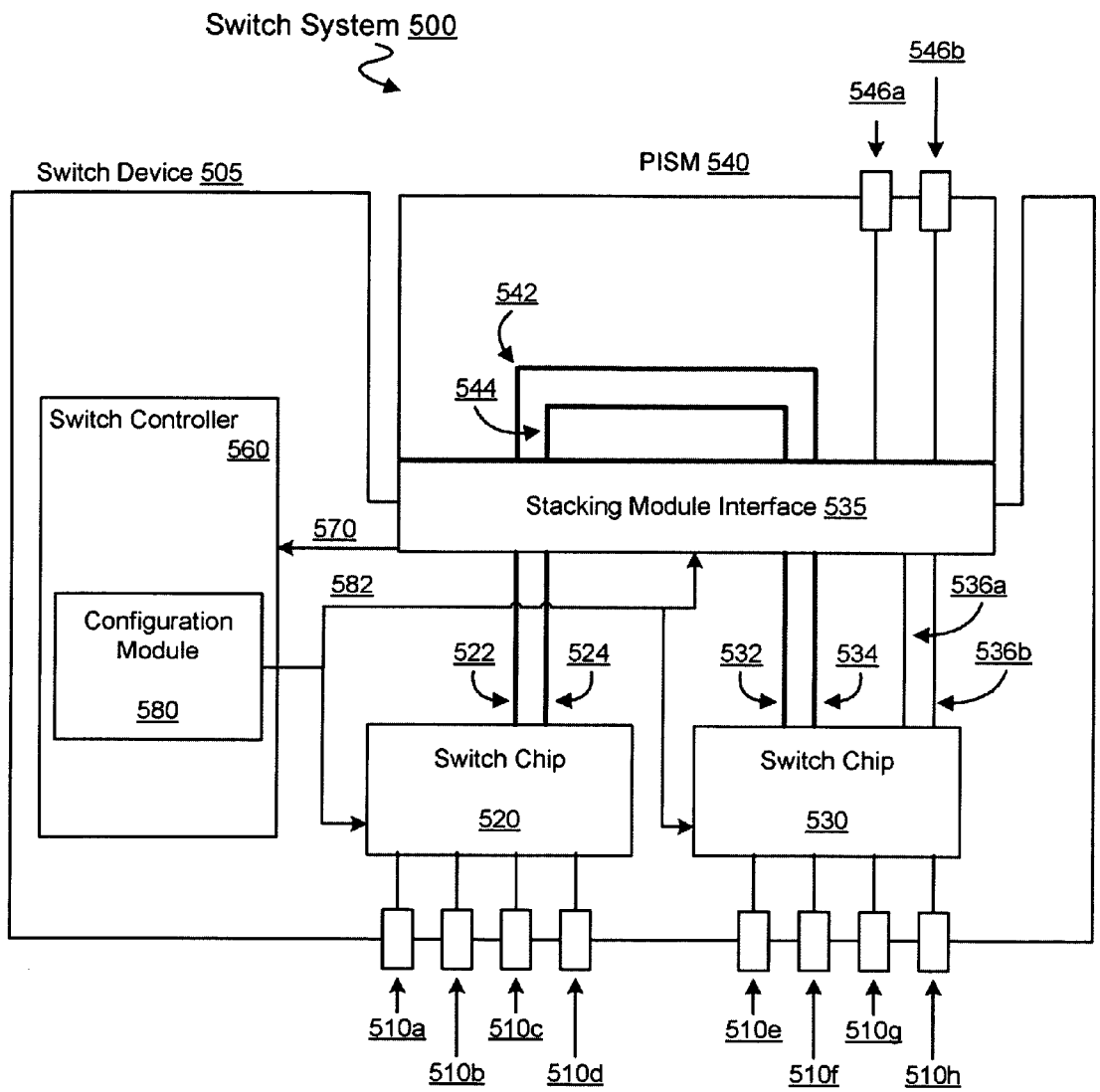
FIG. 5 is a block diagram illustrating select elements of a switch system according to an embodiment.

FIG. 5 illustrates select features of a switch system 500 according to various embodiments. Switch system 500 may include a switch device 505 and a PISM 540. In an embodiment, switch device 505 may include any of a variety of features discussed herein with reference to switch device 200. Alternatively or in addition, PISM 540 may include any of a variety of features discussed herein with reference to PISM 300. As shown in FIG. 5, the front panel of switch device 505 may incorporate four ports 510a-510d switchably interconnected by a switch chip 520, and four ports 510e-510h switchably interconnected by a switch chip 530. It is understood that the particular number and/or arrangement of ports 510a-510h and switch chips 520, 530 are not limiting on aspects of the invention, which may be extended to apply to fewer or greater pluralities of front panel ports in various additional or alternative configurations of switch means in switch device 505. Switch device 505 demonstrates an additional feature according to certain embodiments wherein one or more front panel ports (e.g. ports 510g, 510h) may optionally be switched back to stacking module interface 535—e.g. via channels 536a, 536b. The switching of front panel ports to stacking module interface 535 enables switch device 505 to be configured for backward compatible switch stacking.

In an illustrative embodiment, ports 510a-510h may include Ethernet ports each with a bandwidth of 10 Gb/s. Each of switch chips 520 and 530 connects to and switchably interconnects, respectively, ports 510a-510d and ports 510e-510h. In order to support full non-blocking switching among their respective sets of front panel ports, each of switch chips 520, 530 may have an internal switching bandwidth no less than the total I/O bandwidth of their respective sets of ports—e.g. 4×10 Gb/s=40 Gb/s. Therefore, switch chip 520 may have a switching bandwidth of 50 Gb/s of Ethernet packet traffic and will route any Ethernet Layer 3 or Layer 2 packet from any port on switch chip 520 to any other port on switch chip 520—e.g. based on standard Ethernet routing rules (e.g. MAC address or IP address based).

Data channels 522, 524 may connect switch chip 520 to stacking module interface 535, and data channels 532, 534 may connect switch chip 530 to stacking module interface 535. PISM 540 is connected to stacking module interface 535 to provide a stacking capability to switch device 500. In an embodiment, switch device 505 may avail of switch stacking only via the stacking ports 546a, 546b, which may exchange data for backward compatibility channels 536a, 536b. Otherwise the switch means of switch device 505 can only avail of channels 524, 544 of PISM 540. According to the configuration shown, channels 524, 544 may provide an additional path for interconnecting switch chip 520, 530—e.g. to enable non-blocking switching of data between switch chips 520. Such a configuration of channels 522, 524, 532, 534 with respect to stacking module interface 535 allows PISM 540 to be replaced with another PISM such as PISM 440. This allows users to replace one PISM for another depending on whether a particular ability to stack switches is desired.

Since a manufacturer may not know which particular stacking capability may be desired by a user, the routing of data channels from switching means of switch device to stacking module interface 535 allows a more efficient data channel layout which is incorporated into the PISM 540 rather than switch device 505. This avoids the added cost and complexity of including multiple data channels in switch device 505, at least some of which may not be used for a desired switch stacking configuration selected by a user.

In order to avail of the switch stacking capacity of PISM 540, switch device 505 may change switching configurations—e.g. via switch controller 560. Switch controller 560 may to receive an indication 570 of a switch capability of PISM 540 such as a switch stacking capability. Based on the particular switching configurations to be changed on either or both of switch device 505 and PISM 540, a configuration module 580 of switch controller 560 may transmit configuration messages to select switch components of switch system 500.

Switch system 500 may be configured so that PISM 540 only switches data for switch device 505. More particularly, channels 542 and 544 may only return to switch device 505 data received at PISM 540 from switch device 505. In such a configuration, the switch device is merely capable of being stacked, and is not actually stacked, with another switch device—e.g. via stacking ports 546a, 546b. Alternatively or in addition, switch system may be connected to one or more other switch devices (not shown) via stacking ports 546a, 546b, and reconfigured accordingly.

Figure 6:
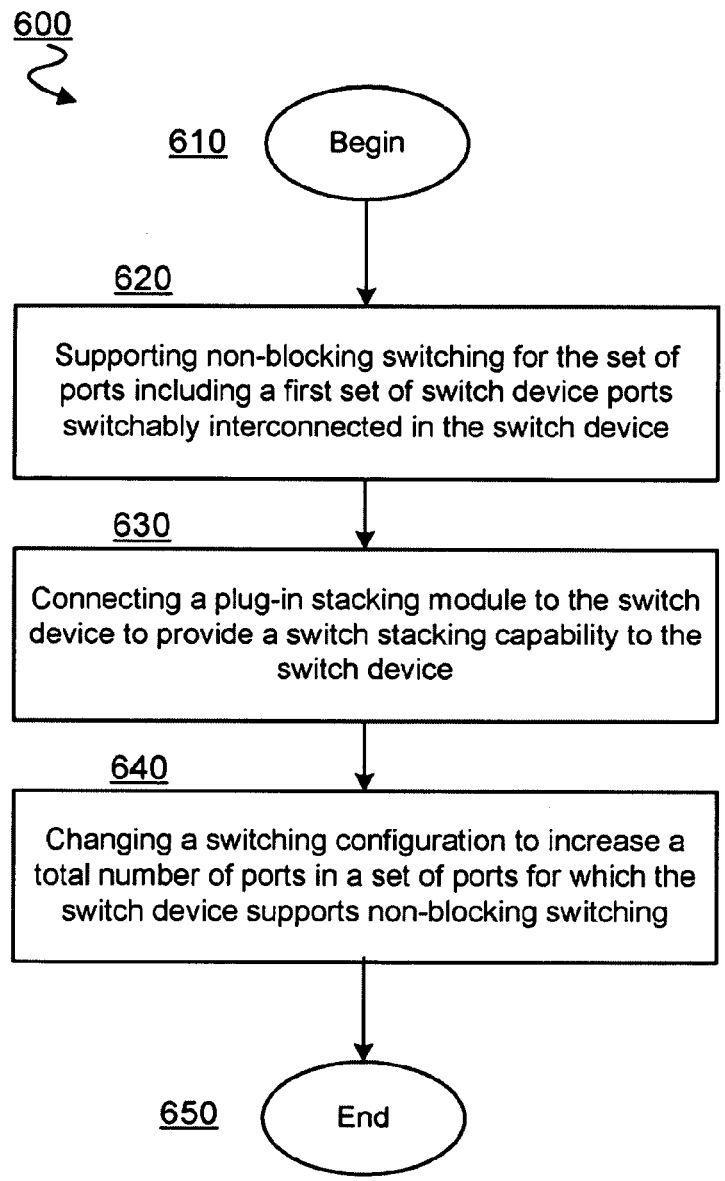
FIG. 6 is a flow diagram illustrating an algorithm for implementing switch stacking capability according to an embodiment.

FIG. 6 illustrates select elements of an algorithm 600 for a method of implementing switch stacking capability according to an embodiment. Algorithm 600 may be performed by a switch system such as one or more of switch systems 400, 500, for example. According to one embodiment, algorithm 600 may begin at 610 with a switch device—e.g. switch device 200, which includes a stacking module interface to receive a PISM. The switch device may, at 620, include a plurality of ports including a set of ports which are switchably interconnected within said switch device. More particularly, said switch device may support non-blocking switching for a set of ports which includes the first set of ports switchably interconnected by said switch device. In various embodiments, there may be one or more other of the ports of the switch device which the switch device itself cannot independently switchably interconnect with any of the first set of ports.

According to an embodiment, at 630, a PISM such as one of PISMs 440, 540 may be connected to the switch device—e.g. via stacking module interface 435. The connected PISM may thereby provide a switch stacking capability to the switch device. It is appreciated that the provided switch stacking capability may be contingent, for example, on changing of one or more switching configurations—e.g. when it is actually determined that the switch is to be stacked with one or more other switching devices. With the PISM connected to the switch device a switching configuration may be changed, at 640, to increase a total number of ports in the set of ports for which the switch device supports non-blocking switching. The algorithm 600 may end at 650 with a larger total number of switchably interconnected ports for which non-blocking switching is supported.

In one embodiment, exchanging data between the switch device and the connected plug-in stacking module according to the changed switching configuration may include the connected plug-in stacking module switching back to the switch device data received at the plug-in stacking module from the switch device. In a more particular embodiment, the connected plug-in stacking module may exchange switched data only with the switch device.

Figure 7:
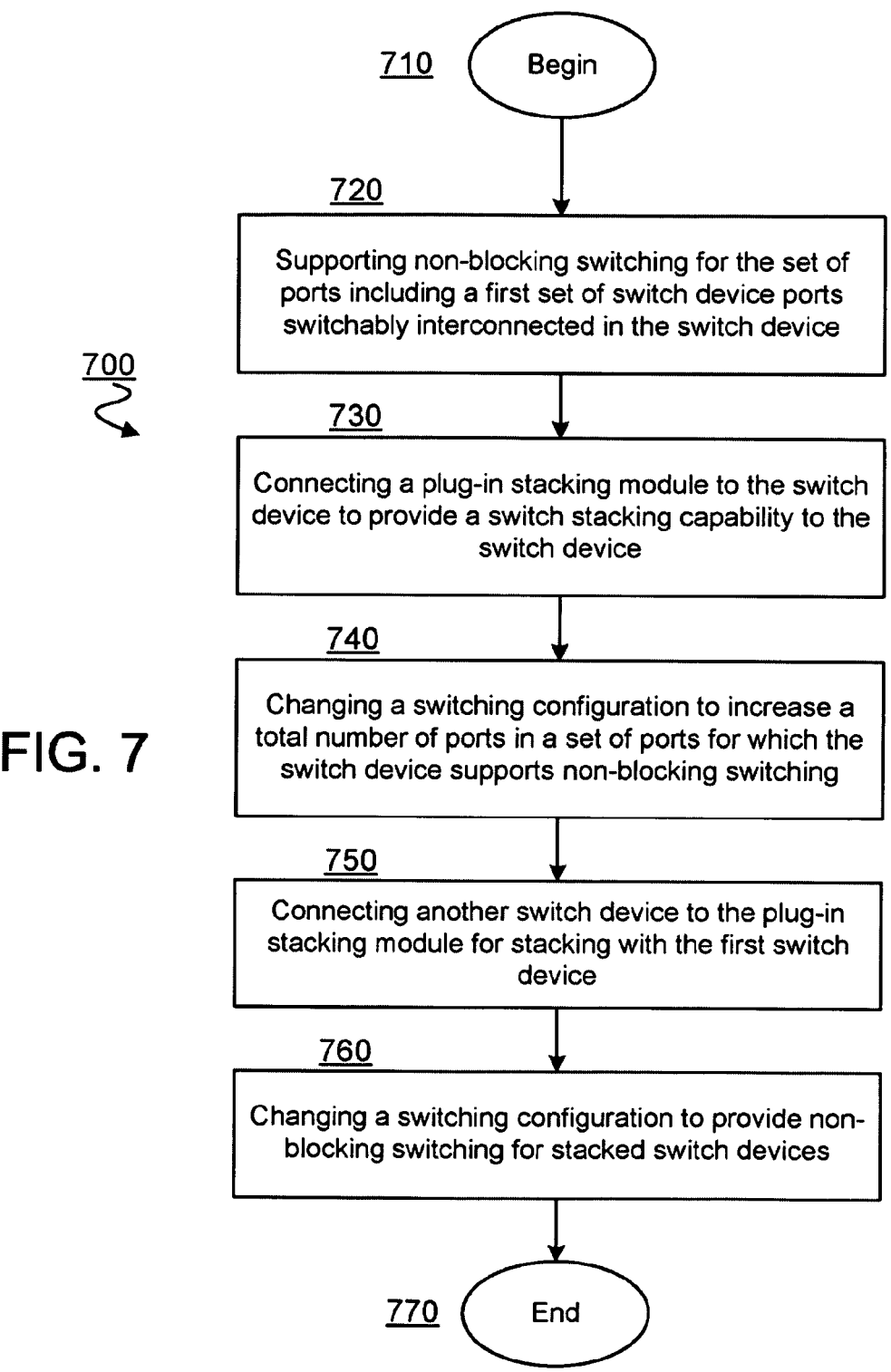
FIG. 7 is a flow diagram illustrating an algorithm implementing switch stacking capability according to an embodiment.

FIG. 7 illustrates select elements of an algorithm 700 for a method of implementing switch stacking capability according to an embodiment. Algorithm 700 may be performed by a switch system such as one or more of switch systems 400, 500, for example. According to one embodiment, algorithm 700 may begin at 710 with a switch device—e.g. switch device 200, which includes a stacking module interface to receive a PISM. The switch device may, at 720, include a plurality of ports including a set of ports which are switchably interconnected within said switch device. More particularly, said switch device may support non-blocking switching for a set of ports which includes the first set of ports switchably interconnected by said switch device. In various embodiments, there may be one or more other of the ports of the switch device which the switch device itself cannot independently switchably interconnect with any of the first set of ports.

According to an embodiment, at 730, a PISM such as PISM 440 may be connected to the switch device—e.g. via stacking module interface 435. The connected PISM may thereby provide a switch stacking capability to the switch device. It is appreciated that actual use of the provided switch stacking capability may depend, for example, on changing of one or more switching configurations—e.g. when it is actually determined that the switch is to be stacked with one or more other switching devices. With the PISM connected to the switch device a switching configuration may be changed, at 740, to increase a total number of ports in the set of ports for which the switch device supports non-blocking switching.

Additionally, at 750, another switch device may be connected to the PISM—e.g. for stacking with the switch device which connects to PISM at 730. With the two switches connected via the PISM, further switch configuration changes may be made to provide switch stacking. The algorithm 700 may end at 770 with a larger total number of switchably interconnected ports for which non-blocking switching is supported, the set of ports spanning a plurality of stacked switches.

Figure 8:
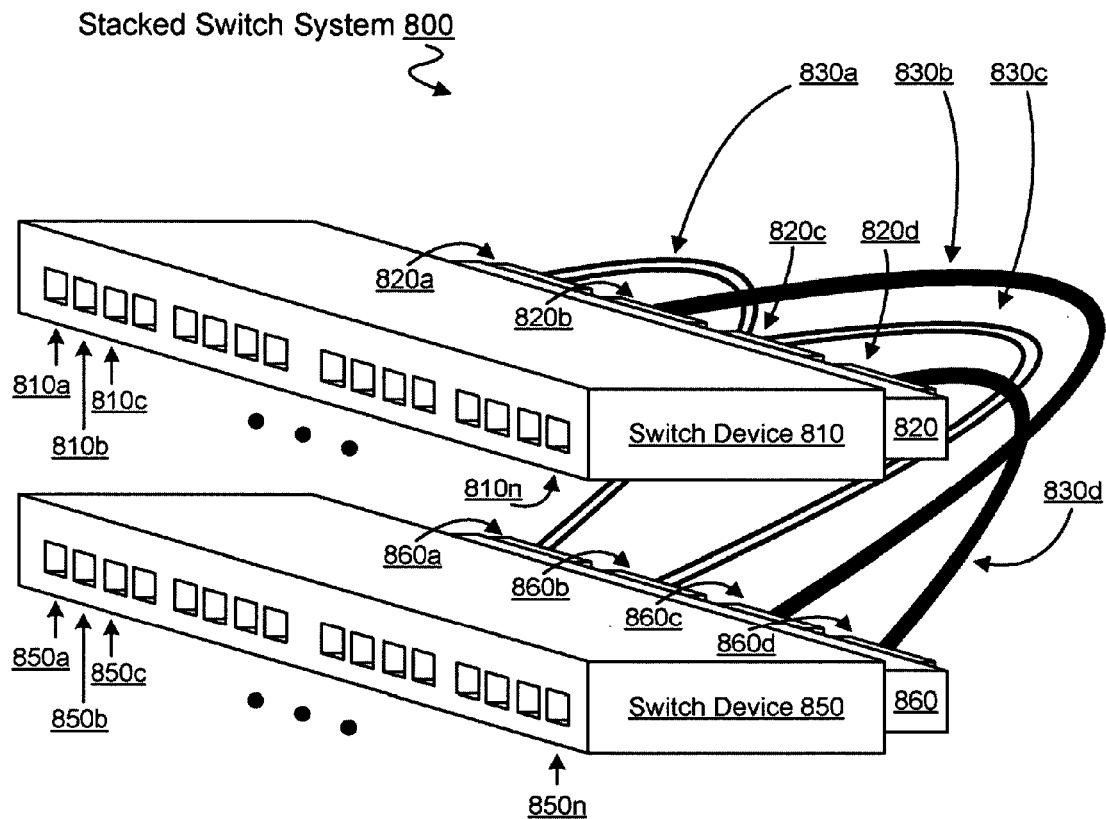
FIG. 8 is a diagram illustrating a stacked switch system according to an embodiment.

FIG. 8 illustrates select features of a switch system 800 according to various embodiments. Switch system may include switch devices 810, 850, which include respective plurality of ports 810a-810n and 850a-850n. One or both of switch devices 810, 850 may include select features described herein with respect to switch device 200, for example. Switch devices 810, 850 may be connected, respectively, to PISM 820 and PISM 860. One or both of PISM 820 and PISM 860 may include select features described herein with respect to PISM 300, for example. In an embodiment, PISM 820 may include stacking ports 820a-820d, and PISM 860 may include stacking ports 860a-860d.

Switch system 800 may include stacking cables 830a, 830b, 830c, 830d to connect stacking ports 820a, 820b, 820c, 820d, respectively, to stacking ports 820a, 820c, 820b, 820d. The particular type of cross-connecting of stacking ports 820a-820d to 860a-860c shown in FIG. 8 may be consistent with the type of stacking capability provided in switch system 400. For example, if switch system 400 were connected to an identical switch system 400—e.g. where stacking ports 446a-446d are connected to corresponding stacking ports of another switch device 405/PISM 440 combination, then the particular cross-connection shown in FIG. 8 would provide full non-blocking switching for all front panel ports of both switch devices, provided the hardware of the stacked stitches and the PISMs all support the total I/O bandwidth of all ports.

Figure 9:
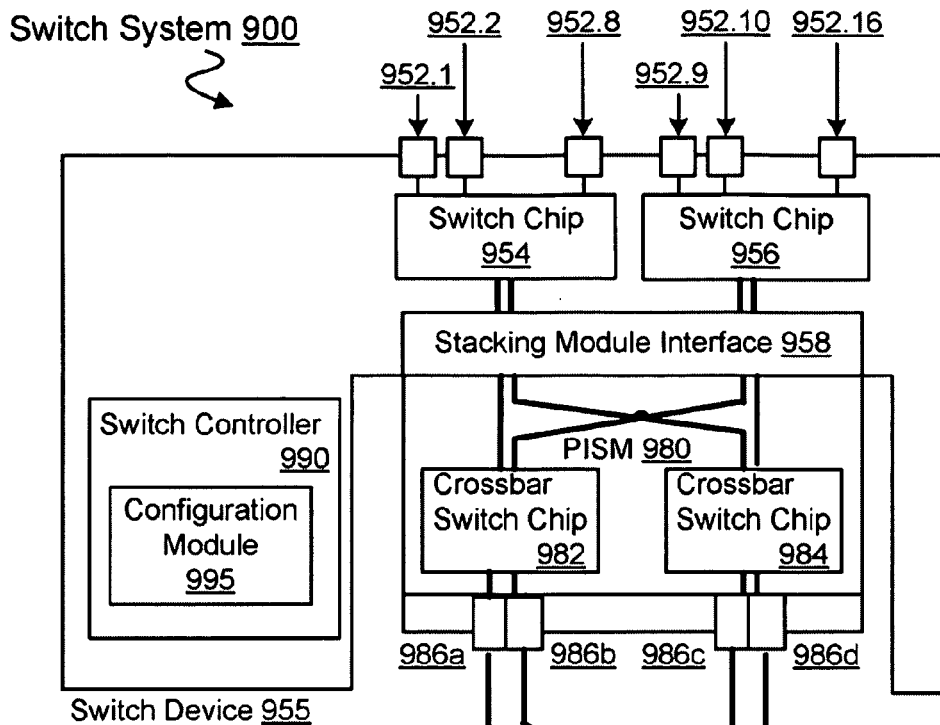
FIG. 9 is a block diagram illustrating a switch system according to an embodiment.
Figure 9:
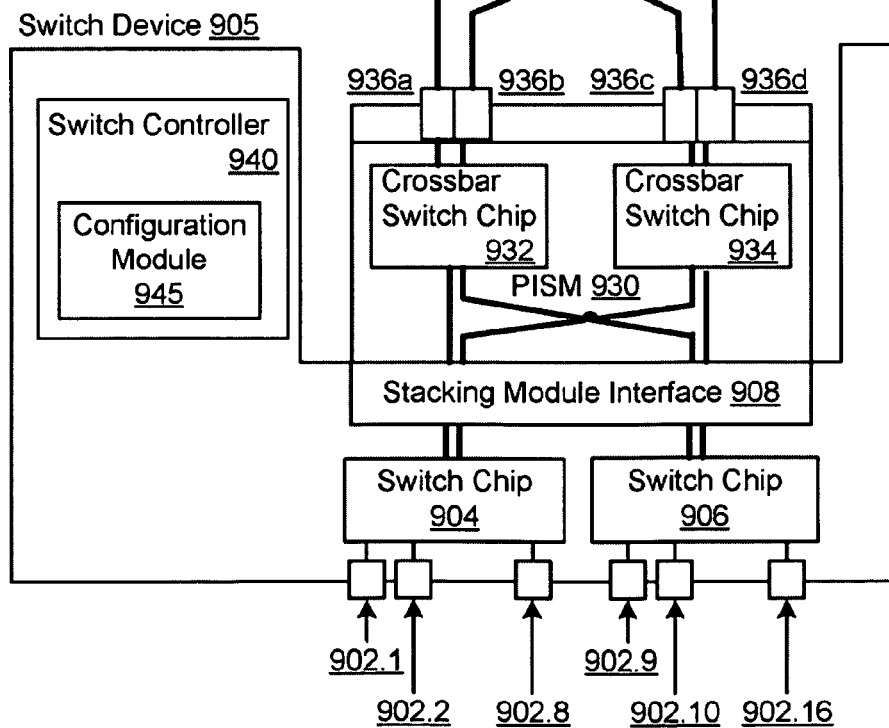

FIG. 9 is a block diagram illustrating more particularly select elements of a switch system configuration similar to that of stacked switch system 800. Switch system 900 includes a PISM 930 connected to a switch device 905 to provide a switch stacking capability to switch device 905. Switch system 900 also includes a PISM 980 connected to a switch device 955 to provide a switch stacking capability to switch device 955. One or more of switch devices 905, 955 may include any of a variety of features discussed herein with reference to switch device 405, and one or more of PISMs 930, 980 may include any of a variety of features discussed herein with reference to PISM 440.

Switch device 905 includes switch chips 904, 906 to provide non-blocking switching for their respective ports 902.1-902.8 and ports 902.9-902.16. Similarly, switch devices 955 includes switch chips 954, 956 to provide non-blocking switching for their respective ports 952.1-952.8 and ports 952.9-952.16. Switch devices 905 and 955 may be stacked via their respective PISMs 930, 980, wherein stacking modules 908, 958, switch controllers 940, 990, and configuration modules 945, 995, for example, each provide switch device functionality corresponding to that of respective switch device elements discussed with respect to FIG. 4. More particularly, stacking ports 936a, 936b, 936c, 936d of PISM 930 may be connected, respectively to stacking ports 986a, 986c, 986b, 986d of PISM 980. This partial cross connection of crossover switch chips 932, 934 with crossover switch chips 982, 984, which corresponds to the partial cross-connection by stacking ports 820a-860d and 860a-860d, may provide for full non-blocking switching across all ports 902.1-902.16 and 952.1-952.16 of switch system 900.

Techniques and architectures for switching data are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A switch device comprising:
   first switching circuitry;
   a plurality of ports to exchange data, the plurality of ports including a first set of ports switchably interconnected with one another by the first switching circuitry, wherein the switch device supports operation of a set of interconnected ports including the first set of ports as a first set of non-blocked ports, wherein for any given set of non-blocked ports, each port of the set of non-blocked ports is switchably interconnected with each other port of the set of non-blocked ports, and all switching between ports of the set of non-blocked ports is supported, provided a total capacity of all ports of the set of non-blocked ports to receive data is not exceeded;
   second switching circuitry, wherein the first switching circuitry and the second switching circuitry are not interconnected with one another in the switch device;
   a stacking module interface switchably interconnected with the first set of ports; and
   a configuration module to cause the switch device to have
      a first configuration for operation when a first plug-in stacking module (PISM) is coupled to the stacking module interface to enable stacking of the switch device, the first PISM including a first switch interface connector and a data channel, wherein terminal points of the data channel are each coupled directly to the first switch interface connector, and wherein, when the first PISM is coupled to the switch device, the data channel to interconnect the first switching circuitry with the second switching circuitry,
   the configuration module further to cause the switch device to have
      a second configuration for operation when a second PISM is coupled to the stacking module interface to enable stacking of the switch device, the second PISM including a second switch interface connector, a stacking interface and crossbar switch circuitry coupling the second switch interface connector with the stacking interface,
   wherein causing the switch device to have the first configuration or the second configuration is to increase a total number of ports of the first set of non-blocked ports.

2. The switch device of claim 1, the configuration module further to configure the crossbar switch circuitry of the second PISM.

3. The switch device of claim 1, wherein the plurality of ports further includes a second set of ports switchably interconnected with one another by the second switching circuitry, and wherein causing the switch device to have the second configuration includes configuring the second PISM to switchably interconnect the first set of ports and the second set of ports.

4. The switch device of claim 1, the stacking module interface further to provide power from the switch device to a plug-in stacking module.

5. The switch device of claim 1, wherein the first configuration for the data channel to send back to the switch device any data received by the data channel from the switch device.

6. The switch device of claim 1, wherein the first PISM further includes a stacking interface coupled to the first switch interface connector, and wherein causing the switch device to have the first configuration further includes configuring the switch device to exchange data with another switch device via the stacking interface of the first PISM.

7. The switch device of claim 6, wherein causing the switch device to have the first configuration includes configuring the first switching circuitry to reallocate switching bandwidth from supporting one of the plurality of ports to supporting the stacking interface of the first PISM.

8. A system comprising:
   a first switch device having a stacking module interface; and
   a plug-in stacking module (PISM) coupled to the first switch device via the stacking module interface to enable stacking of the first switch device with another switch device;
   wherein the first switch device further includes:
   first switching circuitry;
   a plurality of ports to exchange data, the plurality of ports including a first set of ports switchably interconnected with one another by the first switching circuitry, wherein the first switch device supports operation of a set of interconnected ports including the first set of ports as a first set of non-blocked ports, wherein for any given set of non-blocked ports, each port of the set of non-blocked ports is switchably interconnected with each other port of the set of non-blocked ports, and all switching between ports of the set of non-blocked ports is supported, provided a total capacity of all ports of the set of non-blocked ports to receive data is not exceeded;
   second switching circuitry, wherein the first switching circuitry and the second switching circuitry are not interconnected with one another in the first switch device, wherein the PISM coupled to the first switch device via the stacking module interface includes one of:
      a first PISM having:
         a first switch interface connector; and
         a data channel, wherein terminal points of the data channel are each coupled directly to the first switch interface connector, and wherein, when the first PISM is coupled to the first switch device via the stacking module interface, the data channel to interconnect the first switching circuitry with the second switching circuitry; and
      a second PISM having:
         a second switch interface connector;
         a stacking interface; and
         crossbar switch circuitry coupling the second switch interface connector with the stacking interface; and
   a configuration module to cause the first switch device to have a first configuration for operation when the first PISM is coupled to the stacking module interface, the configuration module further to cause the first switch device to have a second configuration for operation when the second PISM is coupled to the stacking module interface, wherein causing the first switch device to have the first configuration or the second configuration is to increase a total number of ports of the first set of non-blocked ports.

9. The system of claim 8, further comprising:
an additional PISM coupled to the PISM via a stacking interface of the PISM, the additional PISM including an additional switch interface connector; and
an additional switch device coupled to the additional plug-in stacking module via the additional switch interface connector.

10. The system of claim 8, wherein the first configuration for the data channel to send back to the first switch device any data received by the data channel from the first switch device.

11. The system of claim 1, wherein the first PISM further includes a stacking interface coupled to the first switch interface connector, and wherein causing the switch device to have the first configuration further includes configuring the switch device to exchange data with another switch device via the stacking interface of the first PISM.

12. A method comprising:
operating a switch device having a plurality of ports including a first set of ports interconnected with one another by first switching circuitry of the switch device, the operating when a first plug-in stacking module (PISM) is coupled to a stacking module interface of the switch device to enable stacking of the switch device, the first PISM including a first switch interface connector and a data channel, wherein terminal points of the data channel are each coupled directly to the first switch interface connector, and wherein, when the first PISM is coupled to the switch device, the data channel to interconnect the first switching circuitry with second switching circuitry of the switch device, wherein the first switching circuitry and the second switching circuitry are not interconnected with one another in the switch device, a first configuration of the switch device supporting operation of a set of interconnected ports including the first set of ports as a first set of non-blocked ports, wherein for any given set of non-blocked ports, each port of the set of non-blocked ports is switchably interconnected with each other port of the set of non-blocked ports, and all switching between ports of the set of non-blocked ports is supported, provided a total capacity of all ports of the set of non-blocked ports to receive data is not exceeded;
detecting that a second PISM is connected to the stacking module interface of the switch device to enable stacking of the switch device; and
in response to the detecting, changing the switch device to a second configuration for operation with second PISM, the second PISM including a second switch interface connector, a stacking interface and crossbar switch circuitry coupling the second switch interface connector with the stacking interface, wherein changing the switch device to the second configuration is to increase a total number of ports in the first set of non-blocked ports.

13. The method of claim 12, wherein the first configuration for the data channel to send back to the switch device any data received by the data channel from the switch device.

14. The method of claim 12, wherein the first PISM further includes a stacking interface coupled to the first switch interface connector, and wherein causing the switch device to have the first configuration further includes configuring the switch device to exchange data with another switch device via the stacking interface of the first PISM.

15. The method of claim 12, further comprising:
detecting that another switch device is connected to the plug-in stacking module; and
changing a switching configuration in response to the detecting the other switch device for stacking of the switch device and other switch device, wherein increasing the total number of ports in the first set of non-blocked ports includes the set of non-blocked ports having one or more ports from each of the switch device and the other switch device.

16. A non-transitory computer readable storage medium having instructions stored thereon which when executed by a computer cause the computer to perform a method comprising:
operating a switch device having a plurality of ports, including a first set of ports interconnected with one another by first switching circuitry of the switch device, the operating when a first plug-in stacking module (PISM) is coupled to a stacking module interface of the switch device to enable stacking of the switch device, the first PISM including a first switch interface connector and a data channel, wherein terminal points of the data channel are each coupled directly to the first switch interface connector, and wherein, when the first PISM is coupled to the switch device, the data channel to interconnect the first switching circuitry with second switching circuitry of the switch device, wherein the first switching circuitry and the second switching circuitry are not interconnected with one another in the switch device, a first configuration of the switch device supporting operation of a set of interconnected ports including the first set of ports as a first set of non-blocked ports, wherein for any given set of non-blocked ports, each port of the set of non-blocked ports is switchably interconnected with each other port of the set of non-blocked ports, and all switching between ports of the set of non-blocked ports is supported, provided a total capacity of all ports of the set of non-blocked ports to receive data is not exceeded;
detecting that a second PISM is connected to the stacking module interface of the switch device to enable stacking of the switch device; and
in response to the detecting, changing the switch device to a second configuration for operation with second PISM, the second PISM including a second switch interface connector, a stacking interface and crossbar switch circuitry coupling the second switch interface connector with the stacking interface, wherein changing the switch device to the second configuration is to increase a total number of ports in the first set of non-blocked ports.

17. The non-transitory computer readable storage medium of claim 16, wherein the first configuration for the data channel to send back to the switch device any data received by the data channel from the switch device.

18. The non-transitory computer readable storage medium of claim 16, wherein the first PISM further includes a stacking interface coupled to the first switch interface connector, and wherein causing the switch device to have the first configuration further includes configuring the switch device to exchange data with another switch device via the stacking interface of the first PISM.

19. The non-transitory computer readable storage medium of claim 16, further comprising: detecting that another switch device to the plug-in stacking module; and changing a switching configuration in response to the detecting the other switch device for stacking of the switch device and other switch device, wherein increasing the total number of ports in the first set of non-blocked ports includes the set of non-blocked ports having one or more ports from each of the switch device and the other switch device.

\* \* \* \* \*